US010494581B2

(12) United States Patent
Aramburo et al.

(10) Patent No.: US 10,494,581 B2
(45) Date of Patent: Dec. 3, 2019

(54) PROCESS FOR PRODUCING LPG FROM A HEAVY HYDROCARBON FEED

(71) Applicant: SABIC Global Technologies B.V., Bergen op Zoom (NL)

(72) Inventors: Luis Aramburo, Geleen (NL); Dustin Farmer, Houston, TX (US); Scott A. Stevenson, Houston, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 15/762,792

(22) PCT Filed: Sep. 15, 2016

(86) PCT No.: PCT/EP2016/071856
§ 371 (c)(1),
(2) Date: Mar. 23, 2018

(87) PCT Pub. No.: WO2017/055095
PCT Pub. Date: Apr. 6, 2017

(65) Prior Publication Data
US 2018/0265796 A1   Sep. 20, 2018

(30) Foreign Application Priority Data
Sep. 30, 2015 (EP) .................................. 15187640

(51) Int. Cl.
*C10L 3/12* (2006.01)
*C10G 47/18* (2006.01)
*C10G 47/20* (2006.01)
*B01J 29/12* (2006.01)
*B01J 35/10* (2006.01)

(52) U.S. Cl.
CPC ............... *C10L 3/12* (2013.01); *B01J 29/126* (2013.01); *B01J 35/1057* (2013.01); *C10G 47/18* (2013.01); *C10G 47/20* (2013.01); *C10G 2400/26* (2013.01); *C10G 2400/28* (2013.01); *C10L 2290/06* (2013.01)

(58) Field of Classification Search
CPC ..... C10L 3/12; C07C 4/00; C07C 4/02; C07C 4/06; C07C 4/08
See application file for complete search history.

(56) References Cited

U.S. PATENT DOCUMENTS

| | | | | |
|---|---|---|---|---|
| 3,640,819 | A * | 2/1972 | Watkins | B01J 23/76 208/111.15 |
| 3,801,497 | A | 4/1974 | Benner | |
| 4,738,941 | A * | 4/1988 | Dufresne | C10G 47/16 502/66 |
| 5,342,507 | A * | 8/1994 | Dai | B01J 29/166 208/111.15 |
| 7,513,988 | B2 | 4/2009 | Oballa et al. | |
| 8,709,378 | B2 * | 4/2014 | Lee | C01B 3/40 423/651 |
| 8,962,900 | B2 | 2/2015 | Kim et al. | |
| 2007/0062848 | A1 | 3/2007 | Oballa et al. | |
| 2007/0267324 | A1 | 11/2007 | Dalloro et al. | |
| 2010/0160699 | A1 | 6/2010 | Frey et al. | |
| 2018/0273857 | A1 | 9/2018 | Aramburo et al. | |
| 2018/0280944 | A1 | 10/2018 | Aramburo et al. | |
| 2018/0282638 | A1 | 10/2018 | Aramburo et al. | |

FOREIGN PATENT DOCUMENTS

| | | | |
|---|---|---|---|
| WO | 2005080532 A1 | 9/2005 | |
| WO | 2014122620 A1 | 8/2014 | |
| WO | 2015128018 A1 | 9/2015 | |
| WO | 2015128033 A1 | 9/2015 | |
| WO | WO-2015128018 A1 * | 9/2015 | ............. C10G 45/50 |

OTHER PUBLICATIONS

Kaduk et al. (Crystal structure of zeolite Y as a function of ion exchange, The Rigaku Journal, 1995, vol. 12, No. 2) (Year: 1995).*
de Jong et al., "Zeolite Y Crystals with Trimodal Porosity as Ideal Hydrocracking Catalysts," Angew. Chem. Int. Ed. 2010, 49, 10074-10078.
European Search Report from the European Patent Office for European Application No. 15187640; Date of Completion: Mar. 23, 2016; 2 pages.
International Search Report for International Application No. PCT/EP2016/071856; International Filing Date: Sep. 15, 2016; dated Dec. 20, 2016; 5 Pages.
Kaduk, et al.(Crystal Structure of Zeolite Y as a Function of Ion Exchange, The Rigaku Journal, 1995, vol. 12, No. 2; 1995.
Karge et al., "Molecular Sieves: Science and Technology," vol. 3, (2002) pp. 204-255.
Kirk-Othmer Encyclopedia of Chemical Technology, "Molecular Sieves," (2006) pp. 811-853, Fifth Edition, vol. 16.
Ma et al, "Coupled hydrogenation and ring opening of tetralin on potassium modified Pt/USY catalysts," Catalysis Letters, vol. 116, Nos. 3-4, Aug. 2007, pp. 149-154.

(Continued)

Primary Examiner — Youngsul Jeong
(74) Attorney, Agent, or Firm — Cantor Colburn LLP

(57) ABSTRACT

The present invention relates to a process for producing LPG from a hydrocarbon feed comprising polyaromatics, the process comprising contacting said feed in the presence of hydrogen with a M/A/zeolite catalyst under hydrocracking process conditions.

20 Claims, No Drawings

(56) References Cited

OTHER PUBLICATIONS

Raichle et al., "Haag-Dessau Catalysts for Ring Opening of Cycloalkanes," Angew. Chem. Int. Ed. 2001, 40, No. 7, pp. 1243-1246.
Simanzhenkov et al., "Technology for Producing Petrochemical Feedstock from Heavy Aromatic Oil Fractions," Ind. Eng. Chem. Res. 2010, 49, 953-963, 11 Pages.
Written Opinion of the International Searching Authority for International Application No. PCT/EP2016/071856; International Filing Date: Sep. 15, 2016; dated Dec. 20, 2016; 6 Pages.
Zecevic et al., "Heterogeneities of the Nanstructure of Platinum/Zeolite Y Catalysts Revealed by Electron Technology," ACS Nano, 2013, 7(4), pp. 3698-3705.

* cited by examiner

PROCESS FOR PRODUCING LPG FROM A HEAVY HYDROCARBON FEED

CROSS REFERENCE TO RELATED APPLICATIONS

This application is a 371 of International Application No. PCT/EP2016/071856 filed Sep. 15, 2016, which claims priority to European Application No. 15187640.6, filed Sep. 30, 2015, both of which are incorporated by reference in their entirety herein.

The present invention relates to a process for producing LPG from a hydrocarbon feed comprising polyaromatics, the process comprising contacting said feed in the presence of hydrogen with a M/A/zeolite catalyst under hydrocracking process conditions.

Processes for producing LPG from heavy hydrocarbon feeds have been previously described. For instance, WO2005/080532 describes a process for the production of linear alkanes containing less than 6 carbon atoms which comprises putting a mixture comprising one or more hydrocarbons containing at least 6 carbon atoms, in contact with a catalytic composition comprising:

a) at least one element Me selected from Zn, Mo, Cu, Ga, In, W, Ta, Zr, Ti, metals of group VIII Fe, Co, Ni, Ru, Rh, Pd, Os, Ir, Pt, b) a zeolite selected from Y-zeolite and Y-zeolite modified by partial or total substitution of the Si with Ti or Ge and/or partial or total substitution of the aluminum with Fe, Ga or B, with the exclusion of a catalytic composition comprising at least one lanthanide, at least one metal belonging to group VIII and a zeolite selected from Y-zeolite and Y-zeolite modified by partial or total substitution of the Si with Ti or Ge and/or partial or total substitution of the aluminum with Fe, Ga or B when the mixture treated is a mixture containing aromatic compounds. The process of WO2005/080532 is characterized in that a lot of fuel gas is produced. Moreover, the process of WO2005/080532 has a relatively low selectivity for C3 and C4 hydrocarbons.

It was an objective of the present invention to provide a process for producing LPG from heavy hydrocarbon feeds which has an improved selectivity for LPG. Furthermore, it was of the present invention to provide a process for producing LPG from heavy hydrocarbon feeds which has a reduced selectivity for methane. Furthermore, it was an objective of the present invention to provide a process for producing LPG from heavy hydrocarbon feeds which has an improved selectivity for C3 and C4 hydrocarbons.

The solution to the above problem is achieved by providing the embodiments as described herein below and as characterized in the claims. Accordingly, the present invention provides a process for producing LPG from a heavy hydrocarbon feed, the process comprising contacting the feed in the presence of hydrogen with a M/A/zeolite catalyst under process conditions comprising a pressure of 40-150 bara, a temperature of 350-500° C., a WHSV of 0.1-10 $h^{-1}$ and a $H_2$/HC ratio of 1-20, wherein said M/A/zeolite catalyst comprises:

0.05-2.5 wt-% of element M, wherein said element M is one or more elements selected from Group 10 of the Periodic Table of Elements;

0.05-1 wt-% of element A, wherein said element A is one or more elements selected from Group 1 and 2 of the Periodic Table of Elements; and an aluminosilicate zeolite having a pore size of 6-8 Å and a $SiO_2/Al_2O_3$ ratio of 1-45.

In the context of the present invention, it was surprisingly found that by specifically selecting the M/A/zeolite catalyst of the present invention and selecting a pressure of 40-150 bara, a temperature of 350-500° C., a WHSV of 0.1-10 $h^{-1}$ and a $H_2$/HC ratio of 1-20 as process conditions, a heavy hydrocarbon feed comprising polyaromatic hydrocarbon compounds can be more efficiently converted to LPG. Particularly, the production of unwanted side products such as C5-C9 hydrocarbons and/or monoaromatic hydrocarbons can be reduced by selecting the catalyst of the present invention over a catalyst as described in the prior art, such as the catalyst described in WO2005/080532, which does not comprise one or more elements selected from Group 1 and 2 of the Periodic Table of Elements.

Without being bound to theory, it is believed that the presence of a specific amount of element A in the catalyst composition is able to promote ring opening reactions of cyclic hydrocarbons as well as decrease successive cracking reactions leading the formation of ethane and methane. The term "aromatic hydrocarbons" or "aromatics" is very well known in the art. Accordingly, the term "aromatic hydrocarbon" relates to cyclically conjugated hydrocarbon with a stability (due to delocalization) that is significantly greater than that of a hypothetical localized structure (e.g. Kekulé structure). The most common method for determining aromaticity of a given hydrocarbon is the observation of diatropicity in the 1H NMR spectrum, for example the presence of chemical shifts in the range of from 7.2 to 7.3 ppm for benzene ring protons. As used herein, the term "polyaromatics" or "polyaromatic hydrocarbons" relates to a mixture of aromatic hydrocarbons having more than one aromatic ring. As used herein, the term "monoaromatic hydrocarbons" or "monoaromatics" relates to a mixture of aromatic hydrocarbons having only one aromatic ring.

The term "BTX" as used herein relates to a mixture of benzene, toluene and xylenes. As used herein, the term "C# hydrocarbons", or "C#", wherein "#" is a positive integer, is meant to describe all hydrocarbons having # carbon atoms. Moreover, the term "C#+ hydrocarbons" is meant to describe all hydrocarbon molecules having # or more carbon atoms. Accordingly, the term "C9+ hydrocarbons" is meant to describe a mixture of hydrocarbons having 9 or more carbon atoms. The term "C9+ alkanes" accordingly relates to alkanes having 9 or more carbon atoms.

The term "LPG" as used herein refers to the well-established acronym for the term "liquefied petroleum gas". LPG generally consists of a blend of C2-C4 hydrocarbons i.e. a mixture of C2, C3, and C4 hydrocarbons.

Accordingly, the process of the present invention involves contacting a hydrocarbon feed in the presence of hydrogen to a selective catalyst under specifically selected process conditions.

The hydrocarbon feed used in the process of the present invention comprises polyaromatics. The term "hydrocarbon feed" as used herein relates to the hydrocarbon mixture that is subjected to the process of the present invention. Preferably, the hydrocarbon feed used in the process of the present invention comprises at least 10 wt-% polyaromatics, more preferably at least 20 wt-% polyaromatics and most preferably at least 30 wt-% polyaromatics. Preferably, the hydrocarbon feed used in the process of the present invention is selected from the group consisting of heavy cycle oil, light cycle oil, carbon black oil, cracked distillate and pyoil.

The specifically selected process conditions used in the process of the present invention comprise a pressure of 40-150 bara, a temperature of 350-500° C., a Weight Hourly Space Velocity" (WHSV) of 0.1-10 $h^{-1}$ and a "hydrogen to hydrocarbon" ratio ($H_2$/HC ratio) of 1-20.

Preferably, the process conditions comprise a pressure of 50-100 bara. Selecting a process pressure of 50-100 bara was found to lead to an additional improvement in selectivity towards LPG.

Preferably, the process conditions further comprise a temperature of 400-470° C., a WHSV of 1-3 $h^{-1}$ and a $H_2$/HC ratio of 3-10. Selecting a process temperature of 400-470° C. was found to lead to a further reduced fuel gas production due to reduced cracking of C3 and C4. Selecting a WHSV of 1-3 $h^{-1}$ was found to lead to an improved selectivity towards LPG and a reduced methane make. Selecting a $H_2$/HC ratio of 3-10 was found to reduce the formation of coke precursor species.

The selective catalyst used in the process of the present invention is described herein as a M/A/zeolite catalyst, wherein said M/A/zeolite catalyst comprises: 0.05-2.5 wt-% of element M, wherein said element M is one or more elements selected from Group 10 of the Periodic Table of Elements; 0.05-1 wt-% of element A, wherein said element A is one or more elements selected from Group 1 and 2 of the Periodic Table of Elements; and an aluminosilicate zeolite having a pore size of 6-8 Å and a $SiO_2/Al_2O_3$ ratio of 1-45.

Without being bound to theory, it is believed that when the content of element A comprised in the catalyst composition is too low (for instance less than 0.05 wt-%) this results in a non-effective covering of the strong acid sites, which is the intended objective to reduce extensive subsequent cracking reactions while promoting the extent of ring opening reactions of naphthenics. Furthermore, it is believed that when the content of element A comprised in the catalyst composition is too high (for instance more than 1 wt %) this results in an excessive covering of acid sites leading to a low ring opening and cracking activity.

Zeolites are well-known molecular sieves having a well-defined pore size. As used herein, the term "zeolite" or "aluminosilicate zeolite" relates to an aluminosilicate molecular sieve. An overview of their characteristics is for example provided by the chapter on Molecular Sieves in Kirk-Othmer Encyclopedia of Chemical Technology, Volume 16, p 811-853; in Atlas of Zeolite Framework Types, 5th edition, (Elsevier, 2001). Preferably, the catalyst comprises a large pore size aluminosilicate zeolite. Suitable zeolites include, but are not limited to, zeolite Y, faujasite (FAU), beta zeolite (BEA) and chabazite (CHA). The term "large pore zeolite" is commonly used in the field of zeolite catalysts. Accordingly, a large pore size zeolite is a zeolite having a pore size of 6-8 Å.

The aluminosilicate zeolite used in the process of the present invention has a $SiO_2/Al_2O_3$ ratio of 1-45. Means and methods for quantifying the $SiO_2$ to $Al_2O_3$ molar ratio of a zeolite are well known in the art and include, but are not limited to AAS (Atomic Absorption Spectrometer) or ICP (Inductively Coupled Plasma Spectrometry) analysis.

Preferably, the M/A/zeolite catalyst comprises an aluminosilicate zeolite having a $SiO_2/Al_2O_3$ ratio of 5-40. More preferably, the M/A/zeolite catalyst comprises an aluminosilicate zeolite having a $SiO_2/Al_2O_3$ ratio of 5-15. Selecting an aluminosilicate zeolite having a $SiO_2/Al_2O_3$ ratio of 5-15 is believed to improve the thermal stability of catalyst used in the process of the present invention and an improved selectivity towards LPG.

Accordingly, element "M" as used herein is one or more elements selected from Group 10 of the Periodic Table of Elements. Preferably, the M/A/zeolite catalyst comprises 0.5-2 wt-% of element M. All weight percentages of element M as provided herein relate to the amount of element M in relation to the total catalyst composition. Preferably, element M is one or more elements selected from the group consisting of Pd and Pt. Most preferably, element M is Pt.

Accordingly, element A is one or more elements selected from Group 1 and 2 of the Periodic Table of Elements. Preferably, the M/A/zeolite catalyst comprises 0.1-1 wt-% of element A. All weight percentages of element A as provided herein relate to the amount of element A in relation to the total catalyst composition. Selecting a catalyst comprising 0.1-1 wt-% of element A was found to improve the selectivity of the process towards LPG and a reduced methane make. More preferably, the M/A/zeolite catalyst comprises 0.3-1 wt-% of element A. Preferably, element A is one or more elements selected from the group consisting of Na, K, Rb, Cs, Mg, Ca, Sr and Ba. More preferably, element A is one or more elements selected from the group consisting of Na, K, Rb and Cs. Most preferably, element A is K.

The catalyst composition as used in the process of the present invention may comprise further components such as a binder. Known binders include, but are not limited to silica, alumina and clay, such as kaolin. Alumina ($Al_2O_3$) is a preferred binder. The catalyst composition of the present invention preferably comprises at least 10 wt-%, most preferably at least 20 wt-% binder and preferably comprises up to 40 wt-% binder.

The catalyst composition is preferably formed into shaped catalyst particles by any known technique, for instance by extrusion.

Preferably, the aluminosilicate zeolite has a 12-ring structure. These specific aluminosilicate zeolites are well known to the skilled man. An overview of their characteristics is for example provided by the Atlas of Zeolite Framework Types, 5th edition, (Elsevier, 2001). Accordingly, an aluminosilicate zeolite having a 12-ring structure is an aluminosilicate zeolite wherein the pore is formed by a ring consisting of 12 $[SiO_4]$ or $[AlO_4]^+$ tetrahedra.

Preferably, the aluminosilicate zeolite is zeolite Y. Depending on the silica-to-alumina molar ratio ("$SiO_2/Al_2O_3$ molar ratio" or "$SiO_2/Al_2O_3$ ratio") of their framework, synthetic faujasite zeolites are divided into zeolite X and zeolite Y. In X zeolites the $SiO_2/Al_2O_3$ ratio is between 2 and 3, while in Y zeolites it is 3 or higher. Accordingly, zeolite Y is a synthetic faujasite zeolite having a $SiO_2/Al_2O_3$ ratio in their framework of 3 or more. Preferably, the zeolite in the selective alkylation catalyst is in the so-called hydrogen form, meaning that its sodium or potassium content is very low, preferably below 0.1, 0.05, 0.02 or 0.01 wt-%; more preferably presence of sodium is below detection limits.

Preferably, the zeolite Y is partially dealuminated. Preferably, the zeolite Y used in the process of the present invention has a $SiO_2/Al_2O_3$ ratio of 1-45. More preferably, the zeolite Y used in the process of the present invention has a $SiO_2/Al_2O_3$ ratio of 5-40. Preferably, the partially dealuminated zeolite is prepared by controlling $SiO_2/Al_2O_3$ ratio during zeolite synthesis. Alternatively, the zeolite may be partially dealuminated by a post-synthesis modification. Means and methods to obtain dealuminated zeolite by post-synthesis modification are well known in the art and include, but are not limited to the acid leaching technique; see e.g. Post-synthesis Modification I; Molecular Sieves, Volume 3; Eds. H. G. Karge, J. Weitkamp; Year (2002); Pages 204-255. The dealuminated aluminosilicate zeolite may comprise super cages having a size of 12-14 Å. Means and methods for preparing zeolites comprising super cages are well-known in the art and comprise zeolite post-treatments such as acid leaching and steaming, among others. (Angew. Chem., Int. Ed. 2010, 49, 10074, ACS nano, 4 (2013) 3698).

The process of the present invention produces LPG as a process product. Preferably, the process of the present invention produces at least 70 wt-% LPG of the total hydrocarbon process product, more preferably at least 75 wt-% LPG of the total hydrocarbon process product, even more preferably at least 80 wt-% LPG of the total hydrocarbon process product and most preferably at least 85 wt-% LPG of the total hydrocarbon process product. Preferably, the process of the present invention produces less than 5 wt-% methane of the total hydrocarbon process product, more preferably less than 3 wt-% methane of the total hydrocarbon process product, even more preferably less than 2 wt-% methane of the total hydrocarbon process product and most preferably less than 1 wt-% methane of the total hydrocarbon process product.

It is noted that the invention relates to all possible combinations of features described herein, particularly features recited in the claims.

It is further noted that the term "comprising" does not exclude the presence of other elements. However, it is also to be understood that a description on a product comprising certain components also discloses a product consisting of these components. Similarly, it is also to be understood that a description on a process comprising certain steps also discloses a process consisting of these steps.

EXAMPLE

Catalyst Preparation
Physical Mixtures:

The physical mixtures of hydrogenation and solid acid catalysts are composed of commercially available catalyst samples. The hydrogenation catalyst is a $Pt/Al_2O_3$ from UOP, namely R-12. The zeolite is an unmodified zeolite Y from Zeolyst, namely CBV 780. These samples have been mixed in the above mentioned experiments in a 1 to 1 ratio.

Bifunctional Pt/Zeolite Y Catalyst:

65 grams of Zeolyst CBV 780 are divided into 3 ceramic dishes and calcined in air at 100° C. for 3 hours to 300° C. and then to 550° C. for 10 hours using a ramp rate of 3° C./min.

After calcination, 15 grams of pre-dried sample are dispersed in 1 liter of deionized water and stirred at 65° C. overnight. The next day the temperature is raised to 70° C. and a solution of 0.317 g of $Pt(NH_3)_4(NO_4)_2$ is dissolved in 76.4 g of $DI-H_2O$ and added drop wise over a period of 7 hours. The material is allowed to stir overnight at 70° C. prior to filtering off the liquid. The filter cake is re-suspended in 1 liter of fresh $DI-H_2O$ and allowed to stir for 15 min and subsequently filtered again. The washing step is repeated twice more. The material is then allowed to dry overnight on filter paper at room temperature. Next, the material is dried at 80° C. for 3 hours, pressed (10,000 psi), crushed and sieved (35-60 mesh sizing scheme). The sized material is loaded in a tube furnace with an air flow rate of 2.2 L/min. The furnace is heated to 100° C. for 3 hours then to 300° C. for 3 hours at a ramp rate of 0.2° C./min. Subsequently, the material is further calcined to 350° C. at 0.2° C./min for 3 hours. The flows rates are then turned down to down to 1 L/min for 1 hour then to 345 ml/min for 1 hour while 350° C. is maintained. The material is then transferred to the calcination oven and calcined for 3 hours in air using the same ramp rate of 0.2° C./min.

Modified Bifunctional Pt/K/Zeolite Y Catalyst:

24 grams of pre-dried CBV 712 are suspended in 2 liters of deionized water ($DI-H_2O$) and stirred at 40° C. overnight. Next day the temperature is raised to 70° C. and a solution of 0.602 g of $Pt(NH_3)_4(NO_4)_2$ is dissolved in 123.33 g of $DI-H_2O$ and added drop wise over a period of 5 hours. The material is allowed to stir overnight at 70° C. prior to filtering off the liquid. The filter cake is re-suspended in 1 liter of fresh $DI-H_2O$ and allowed to stir for 15 minutes before filtering it again. This washing step is repeated twice more. The material is then allowed to dry at room temperature over the weekend. Next the material is pressed (10,000 psi), crushed and sieved through a 35-60 mesh sizing scheme. The sized material is loaded in a tube furnace with an air flow rate of 2.2 L/min. The furnace is heated to 100° C. for 3 hours then to 300° C. for 3 hours at a ramp rate of 0.2° C./min. Subsequently, the material is further calcined to 350° C. at 0.2° C./min for 3 hours. The flows rates are then turned down to down to 1 L/min for 1 hour then to 345 ml/min for 1 hour while 350° C. is maintained. The material is then transferred to the calcination oven and calcined for 3 hours in air using the same ramp rate of 0.2° C./min.

12 grams of the above described Pt/Zeolite Y catalysts are pre-dried, weighed and added to 0.342 g of KNOB dissolved in 700 ml of $DI-H_2O$. The material is stirred for 7 hours at 65° C. The material is then filtered and rinsed with 150 ml of fresh $DI-H_2O$ directly on the filter cake. The material is subsequently dried on a ceramic dish (100° C., 3 h) and calcined in air (0.2° C./min, 300° C., 3 h).

Experimental Set-Up

The experimental program was conducted on a fully automated 16-fold trickle-flow hydro process unit allowing uninterrupted catalyst testing. The operating range of this unit is summarized in Table.

The 16-fold trickle-flow hydro processing unit operates as follows: The feed is preheated and mixed with hydrogen prior to entering the evaporation zone located on the top part of the set-up. Therein the mixture is heated to the selected reaction conditions. The pressure in the reaction section is maintained with a nitrogen pressure hold gas system (PHG) at the reactor outlet. The reactor section is composed of a 5 mm internal diameter tube with an isothermal zone of 50 mm at the highest operating temperature. Once the reaction has taken place the effluent is sent to a condenser kept at 75° C. Therein the gas is separated from the liquid and sent to an online GC (every 90 min). The liquid collected during reaction is stored and subsequently analyzed offline in a GC-MS. Both, the gas and liquid flows are precisely measured to obtain the combined effluent composition.

TABLE 1

16-fold trickle-flow hydro processing unit specifications.
Set-up specifications

| | |
|---|---|
| Temperature | up to 500° C. |
| Pressure | up to 100 bara |
| Operation mode | Trickle-bed |
| Catalysts volume | up to 1.92 ml |
| Reactor inner diameter | 5 mm |
| Gases | $H_2$, $N_2$, Ar |

Model Feed Composition

The experiments have been carried out with a synthetic feed composed of paraffin's (25 wt %), mono-aromatics (20 wt %), di-aromatics (55 wt %) and tri-aromatics (5 wt %). This is summarized in table 2.

TABLE 2

Model feed composition details.
Model Feed

| | |
|---|---|
| Decane | 25 wt % |
| Propylbenzene | 20 wt % |
| Naphthalene | 25 wt % |
| 1-Methylnaphthalene | 10 wt % |
| 2-Methylnaphthalene | 15 wt % |
| Anthracene | 2 wt % |
| Phenantrene | 3 wt % |

Catalyst Preparation and Reactor Loading:

The series of catalysts tested displayed different sizes and shapes. To minimize the influence of external mass transfer limitations and compare the intrinsic reactivity of each catalyst, similar sieved fractions were used. To this end, zeolite powders were bound with alumina sol, dried, calcined and sieved to the desired size. The zeolite containing samples (namely, solid acid catalysts and/or bifunctional catalysts) were mixed in a 7 to 3 ratio with Dispersal® and the resulting mixture mixed with water (1 to 5 ratio).

Subsequently, the slurry was milled (5 min, 600 rpm), dried in a hot box (110° C., overnight), calcined in air (300° C., 6 h) and sieved to a target fraction of 125-160 μm. On the other hand, the hydrogenation catalysts were milled and sieved to the same target fraction as the zeolite containing samples.

The catalysts were loaded in the reactors together with silicon carbide diluent to form a bed which is ring shaped around a thermowell. A thorough calibration was performed to determine the isothermal zone of the 16 parallel reactor set-up under the temperature conditions tested.

Activation Protocol

The activation and soaking protocol details are summarized in Table 3. After loading the catalyst in the reactor the activation procedure is performed to reduce the metal particles contained in the catalyst. Subsequently, the hydrogen feed is replaced by a mixture of hydrogen and the hydrocarbon feed used in the experiments while the sample is heated up slowly to reaction conditions. This is the so-called soaking procedure.

TABLE 3

Activation and soaking protocol details.

| Activation procedure | | Soaking procedure | |
|---|---|---|---|
| Temperature | 60-400° C. | Temperature | 60° C. |
| Heating ramp | 1° C./min, 2 h hold at 400° C. | WHSV | 2 $h^{-1}$ |
| | | Purge step | $N_2$ during 10 min |
| Purge step | $N_2$ during 10 min | $H_2$ flow | 10 (l/h) |
| Reduction step | $H_2$ | Pressure | 30 bara |
| | | Duration | 16 h |
| H2 flow | 41.5 (l/h) | | |
| Pressure | 30 bara | | |
| Duration | 460 min + Cool down | | |

Experimental Results

The physical mixture catalyst, bifunctional Pt/Zeolite Y catalyst and modified bifunctional Pt/Zeolite Y catalyst, all prepared as described herein above, were contacted with the model feed using the following reaction conditions: a WHSV of 2 $h^{-1}$, a temperature of 450° C., a $H_2$:HC ratio of 10 and a pressure of 60 bara or 100 bara. The process was performed in a continuous system that operated in steady state conditions. In Table 4 the experimental results are describes as an average result of a measuring period of 24 h. Data were generated using GC-MS as described herein above.

TABLE 4

Experimental results (all data provided in wt % except when indicated otherwise)

| catalyst | Pressure | C1 | C2 | C3 | C4 | C5-C9 | Mono-aromatics | Total LPG |
|---|---|---|---|---|---|---|---|---|
| Physical mixture | 100 bara | 0.3 | 1.7 | 16.9 | 29.3 | 6.3 | 27 | 52.2 |
| Pt/Zeolite Y | 100 bara | 0.9 | 2.3 | 28.6 | 47.3 | 9.3 | 2.7 | 78.6 |
| Pt/K/Zeolite Y | 100 bara | 1.7 | 4.4 | 39.3 | 47.3 | 6.1 | 0 | 90.9 |
| Physical mixture | 60 bara | 0.2 | 0.9 | 12 | 18 | 3.8 | 40.4 | 31 |
| Pt/Zeolite Y | 60 bara | 0.8 | 3 | 28.1 | 47.6 | 5.7 | 3.2 | 78.6 |
| Pt/K/Zeolite Y | 60 bara | 1.6 | 4.8 | 39.2 | 47.6 | 5.7 | 0 | 91.5 |

The invention claimed is:

1. A process for producing LPG from a heavy hydrocarbon feed, the process comprising:
    contacting the heavy hydrocarbon feed comprising at least 10 wt-% polyaromatics in the presence of hydrogen with a Pt/K/zeolite catalyst under process conditions comprising a pressure of 50-150 bara, a temperature of 350-500° C., a WHSV of 0.1-10 $h^{-1}$ and a $H_2$/HC ratio of 1-20 to produce a product stream comprising LPG, wherein said Pt/K/zeolite catalyst comprises:
    0.05-2.5 wt-% of Pt;
    0.05-1 wt-% of K; and
    zeolite Y having a $SiO_2/Al_2O_3$ ratio of 1-45.

2. The process according to claim 1, wherein the process conditions comprise a pressure of 50-100 bara.

3. The process according to claim 2, wherein the process conditions further comprise a temperature of 400-470° C., a WHSV of 1-3 $h^{-1}$ and a $H_2$/HC ratio of 3-10.

4. The process according to claim 1, wherein the zeolite Y has a $SiO_2/Al_2O_3$ ratio of 5-40.

5. The process according to claim 1, wherein the Pt/K/zeolite catalyst comprises 0.5-2 wt-% of Pt.

6. The process according to claim 1, wherein the Pt/K/zeolite catalyst comprises 0.1-1 wt-% of K.

7. The process according to claim 1, wherein the zeolite Y comprises super cages having a size of 12-14 Å.

8. The process according to claim 7, wherein the zeolite Y is partially dealuminated.

9. The process according to claim 1, wherein the hydrocarbon feed is selected from the group consisting of heavy cycle oil, light cycle oil, carbon black oil, cracked distillate and pyoil.

10. The process according to claim 1, further comprising recovering LPG from the product stream comprising LPG.

11. The process according to claim 3, wherein the heavy hydrocarbon feed comprises at least 30 wt-% polyaromatics.

12. The process according to claim 11, wherein the Pt/K/zeolite catalyst comprises 0.5-2 wt-% of Pt and 0.1-1 wt-% of K.

13. The process according to claim 12, wherein the LPG contained in the product stream comprises at least 70 wt-% of the product stream.

14. The process according to claim 13, wherein the LPG contained in the product stream comprises at least 75 wt-% of the product stream.

15. The process according to claim 14, wherein the LPG contained in the product stream comprises at least 80 wt-% of the product stream.

16. The process according to claim 15, wherein the LPG contained in the product stream comprises at least 85 wt-% of the product stream.

17. The process according to claim 16, wherein the product stream comprises less than 5 wt-% methane.

18. The process according to claim 17, wherein the product stream comprises less than 3 wt-% methane.

19. The process according to claim 18, wherein the product stream comprises less than 2 wt-% methane.

20. The process according to claim 19, wherein the product stream comprises less than 1 wt-% methane.

* * * * *